(12) United States Patent
Rocznik (10) Patent No.: US 8,499,639 B2
(45) Date of Patent: Aug. 6, 2013

(54) INDUCTIVELY COUPLED PRESSURE SENSOR

(75) Inventor: Marko Rocznik, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 12/819,573

(22) Filed: Jun. 21, 2010

(65) Prior Publication Data

US 2011/0308320 A1    Dec. 22, 2011

(51) Int. Cl.
*G01L 11/00*    (2006.01)

(52) U.S. Cl.
USPC .................................. 73/702; 73/700; 73/753

(58) Field of Classification Search
None
See application file for complete search history.

(56) References Cited

U.S. PATENT DOCUMENTS

| | | | | |
|---|---|---|---|---|
| 3,962,921 | A | * | 6/1976 | Lips ................................. 73/724 |
| 4,186,749 | A | * | 2/1980 | Fryer ............................. 600/561 |
| 4,490,773 | A | * | 12/1984 | Moffatt ....................... 361/283.4 |
| 4,852,443 | A | * | 8/1989 | Duncan et al. .................. 84/733 |
| 5,760,577 | A | * | 6/1998 | Shizuya .................... 324/207.16 |
| 6,016,707 | A | * | 1/2000 | Lin et al. .......................... 73/728 |
| 6,442,812 | B1 | * | 9/2002 | Kovacich et al. ............ 29/25.35 |
| 6,532,822 | B1 | * | 3/2003 | Boyd ............................... 73/702 |
| 2007/0074579 | A1 | * | 4/2007 | Cook et al. ...................... 73/718 |
| 2009/0139330 | A1 | | 6/2009 | Pavelescu et al. |

FOREIGN PATENT DOCUMENTS

| | | |
|---|---|---|
| DE | 10323297 A1 | 12/2003 |
| DE | 102008040820 A1 | 9/2009 |
| EP | 2108934 A2 | 10/2009 |
| WO | 2006060226 A1 | 6/2006 |

OTHER PUBLICATIONS

International Search Report and Written Opinion in corresponding PCT Application (i.e., PCT/US2011/040661), mailed Oct. 7, 2011 (9 pages).

* cited by examiner

*Primary Examiner* — Lisa Caputo
*Assistant Examiner* — Jermaine Jenkins
(74) *Attorney, Agent, or Firm* — Maginot, Moore & Beck (57) ABSTRACT

In one embodiment, a pressure sensor assembly for use with an application specific integrated circuit includes a capacitive sensor, a sensor coil within a first sensor compartment and operatively connected to the capacitive sensor to form a sensor L-C tank circuit, a measuring oscillator including a measuring coil located within a second sensor compartment and spaced apart from the sensor coil and a feedback circuit configured to provide a control signal for the measuring oscillator based upon an output of the measuring oscillator, and a low frequency signal source configured to provide a low frequency signal to the measuring oscillator.

23 Claims, 9 Drawing Sheets

INDUCTIVELY COUPLED PRESSURE SENSOR

FIELD OF THE INVENTION

This invention relates to the field of pressure sensors and more particularly to capacitive pressure sensors.

BACKGROUND OF THE INVENTION

As systems become more sophisticated, incorporation of increased amounts of data in controlling those systems is useful in maximizing the system performance. Thus, in automotive applications, data associated with the pressure of various media including air, gasoline or transmission oil may be used to optimize engine performance.

One practice in engine design directed toward increased fuel efficiencies is to mix engine exhaust with fresh air so as to preheat the incoming air. Obtaining the pressure of the resultant air/exhaust mixture, however, necessitates exposing a sensor element to a significantly more aggressive and hotter environment. Accordingly, contemporary pressure sensors require special protection of the electrical connections on the sensor.

One approach to protecting sensitive components of a sensor assembly from harsh environments is to deposit a gel over the sensor and electronics, thereby sealing the vulnerable electrical connections from the harsh media. Other sensors physically separate sensitive electronics from the harsh environment. In these sensors, one of a pair of coils, along with the sensitive electronics, is placed in a protected environment. A second coil an substrate, made of a material that is resistant to the harsh environment, is positioned in the harsh environment and data is passed between the coils.

While effective in isolating the sensitive components of the sensor from the harsh environment that is monitored by the sensor assembly, sensors incorporating additional materials introduce additional manufacturing steps. Moreover, the protective materials tend to break down over time and lose the ability to protect the sensor, thereby shortening the useful life of the sensor.

Additionally, as a monitored engine continues to be operated, the temperature of the exhaust varies. The change in temperature can affect the sensor assembly characteristics thereby exacerbating sensor system inaccuracies. Some of the temperature related inaccuracies may be mitigated by measuring the temperature and applying a temperature correction. As the number of sensors increases, however, costs associated with the system increase. Additionally, additional space is required for the additional component.

Accordingly, a sensor assembly which protects sensitive components from harsh environments without requiring protective materials on sensor components would be advantageous. A sensor assembly that provided temperature data along with pressure data would be further advantageous. A sensor assembly that used temperature data to optimize sensor system accuracy would be further advantageous.

SUMMARY OF THE INVENTION

In one embodiment, a pressure sensor assembly for use with an application specific integrated circuit includes a capacitive sensor, a sensor coil within a first sensor compartment and operatively connected to the capacitive sensor to form a sensor L-C tank circuit, a measuring oscillator including a measuring coil located within a second sensor compartment and spaced apart from the sensor coil and a feedback circuit configured to provide a control signal for the measuring oscillator based upon an output of the measuring oscillator, and a low frequency signal source configured to provide a low frequency signal to the measuring oscillator.

In another embodiment, a method of identifying a pressure of a fluid includes coupling a measuring oscillator which is isolated from the fluid with a sensor component, establishing a circulating current within the sensor component through the coupling, exposing a capacitive sensor of the coupled sensor component to the fluid, establishing a resonant frequency of the sensor component based upon the exposure, varying the frequency of the coupled measuring oscillator, generating a change in voltage for the measuring oscillator with the varied frequency, controlling the frequency of the measuring oscillator based upon the generated change in voltage, and generating a signal associated with the pressure of the fluid based upon the controlled frequency of the measuring oscillator.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system components and arrangement of system components. The drawings are only for purposes of illustrating exemplary embodiments and are not to be construed as limiting the invention.

DESCRIPTION

Figure 1:
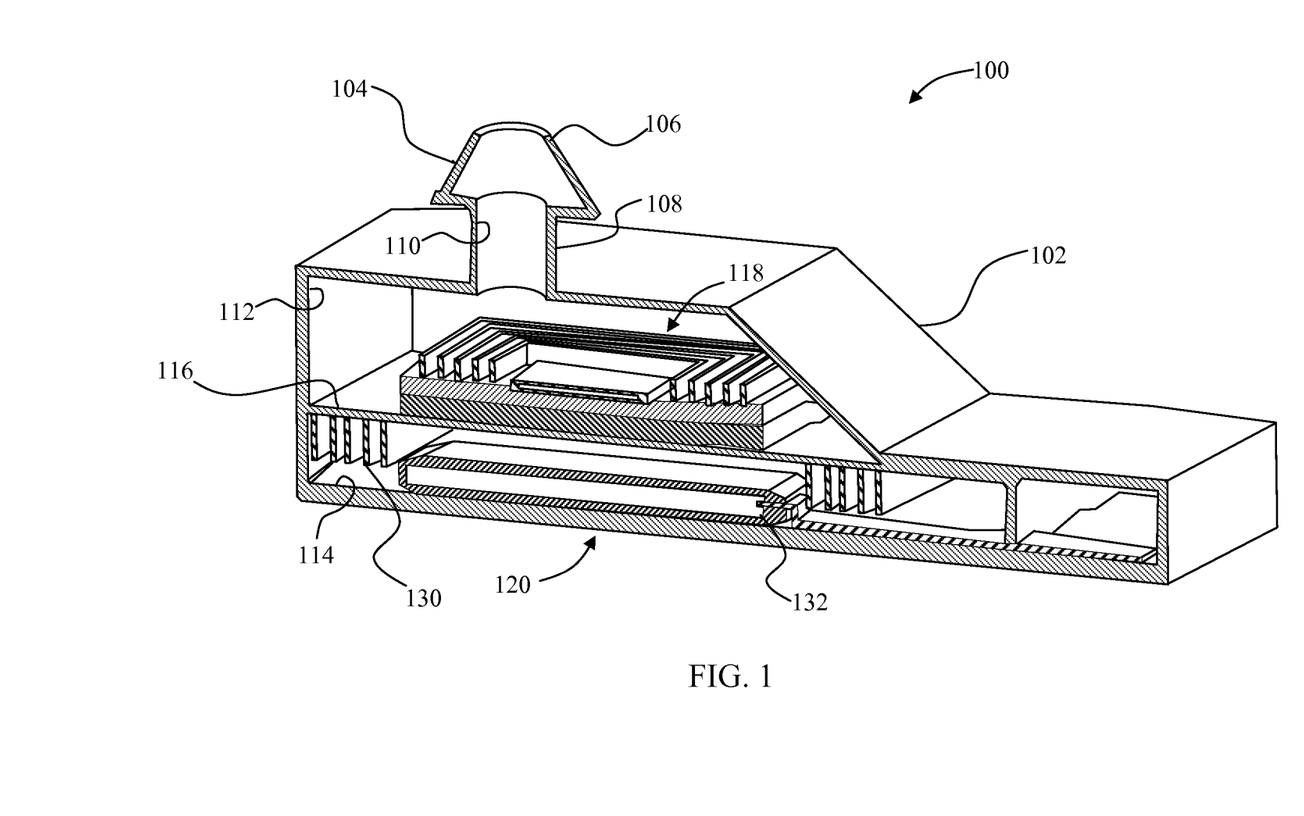
FIG. 1 depicts a cross-sectional perspective view of a sensor assembly with sensitive electronics protected from the environment that is monitored in accordance with principles of the invention.

Referring to FIG. 1, a sensor assembly 100 includes a housing 102 and a sense port 104. The sense port 104 includes a coupling portion 106 and a neck 108. A bore 110 extends from the coupling portion 106 to a sensor compartment 112. The sensor compartment 112 is isolated from an electronics compartment 114 by a substrate 116 which in this embodiment is integrally formed with the housing 102. A sensor 118 is positioned within the sensor compartment 112 and an electronic assembly 120 is positioned within the electronics compartment 114.

Figures 2, 3:
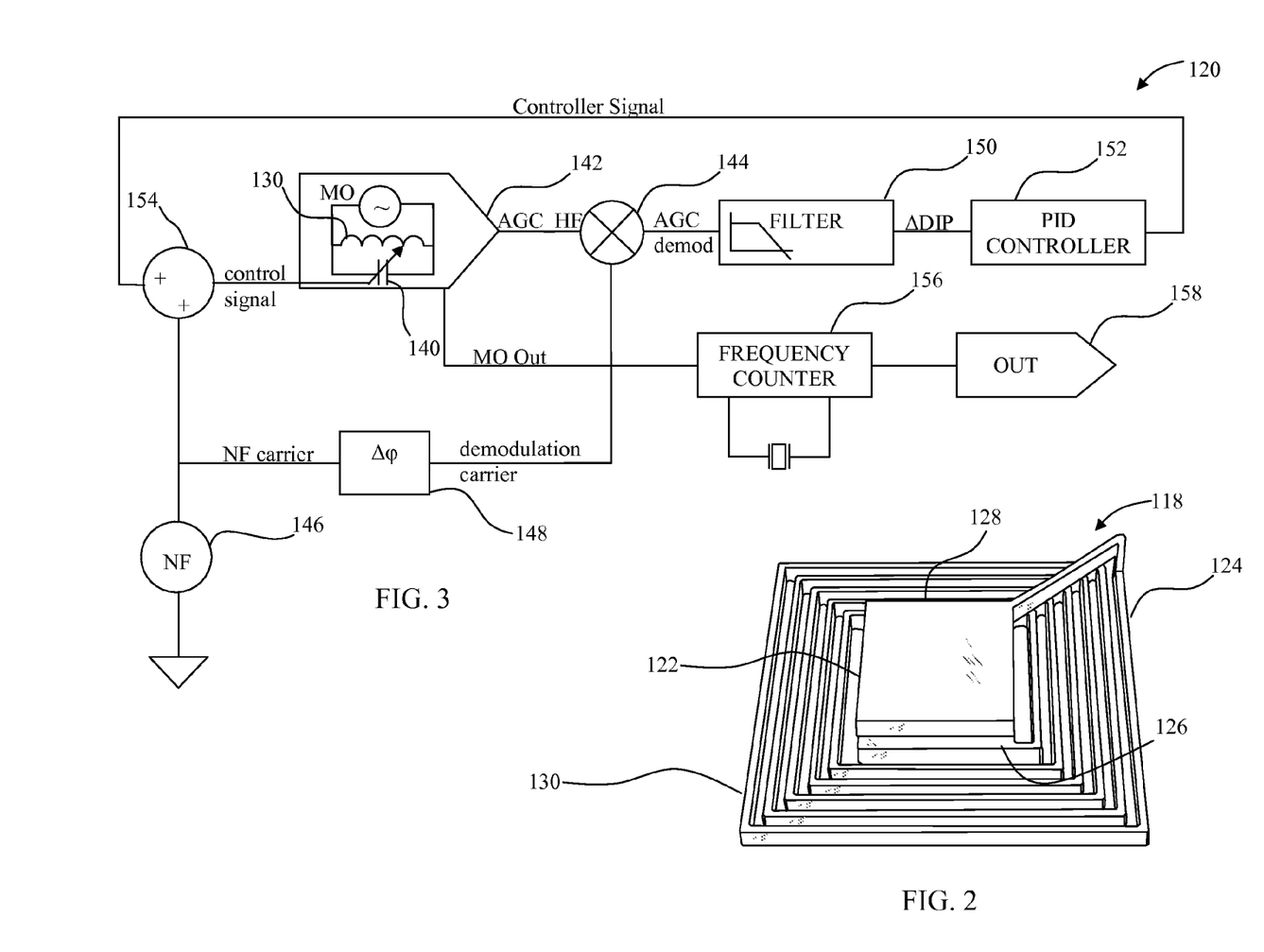
FIG. 2 depicts a perspective view of the sensor used in the sensor assembly of FIG. 1 including a capacitive sensor and a loop which form a tank circuit.
FIG. 3 depicts a system diagram of a circuit on the application specific integrated circuit of the sensor assembly of FIG. 1 that provides automatic tuning of a measuring oscillator to match the resonant frequency of a tank circuit of the sensor of FIG. 1.

The sensor 118, also shown in FIG. 2, includes a capacitive pressure sensor 122 and a coil 124. The coil 124 is connected to the capacitive pressure sensor 122 by electrodes 126 and 128. The sensor 118 thus forms an LC tank circuit with the capacitive pressure sensor 122 functioning as a capacitor which varies in capacitance as the pressure within the sensor compartment 112 varies while the coil 124 functions as an inductor.

The electronic assembly 120 includes a primary coil 130 and an application-specific integrated circuit (ASIC) 132. The electronic assembly 120 is depicted schematically in FIG. 3. In FIG. 3, the primary coil 130 is in parallel with a variable capacitor 140 to form a measuring oscillator 142. The measuring oscillator 142 may be a voltage control oscillator or a digitally controlled oscillator. The output of the measuring oscillator 142 is provided to a demodulator 144. The demodulator 144 further receives a low frequency signal from a low frequency source 146 through an optional phase corrector 148. Typically, the phase correction is small and in certain applications the phase corrector 148 may be omitted.

The output of the demodulator 144 is provided to an optional filter 150 and the signal from the filter 150 is passed to a proportional-integral-derivative (PID) controller 152. The PID controller 152 output is provided to a summer 154 which combines the output of the PID controller 152 with the output of the low frequency source 146. The output of the summer 154 is used to control the variable capacitor 140. An optional frequency counter 156 is provided to count the cycles of the measuring oscillator 142 and the measured frequency is provided as an output 158. Alternatively, the output of the PID controller 152 may be used as an output. By way of example, the average capacitor value may be used to ascertain the pressure sensor capacity directly. Increased accuracy may be obtained by providing temperature compensation for the measuring oscillator 142 using this alternative approach.

In operation, the electronic assembly 120 is used to identify the resonant frequency of the sensor 118. To this end, the variable capacitor 140 and the primary coil 130 function as a variable frequency oscillator circuit of the measuring oscillator 142. The frequency of the oscillation of the measuring oscillator 142 is modified by changing the capacitance of the variable capacitor 140. In general, as the measuring oscillator 142 oscillates, the primarily coil 130 establishes a magnetic field which loosely couples the primarily coil 130 and the coil 124 in the sensor 118. As the frequency of the measuring oscillator 142 approaches the resonant frequency of the sensor 118, a circulating current is developed within the sensor 118 through the established coupling.

Because of the circulating current within the coil 124, an impedance is reflected through the coupling between the primary coil 130 and the coil 124 to the primary coil 130, causing an increase in loop gain y he PID controller 152 in order to compensate for the energy drain and keep the amplitude of the measuring oscillator 142 stable. At the resonant frequency of the sensor 118, the circulating current within the coil 124, and thus the reflected impedance into the measuring oscillator 142, is maximized.

Figure 4:
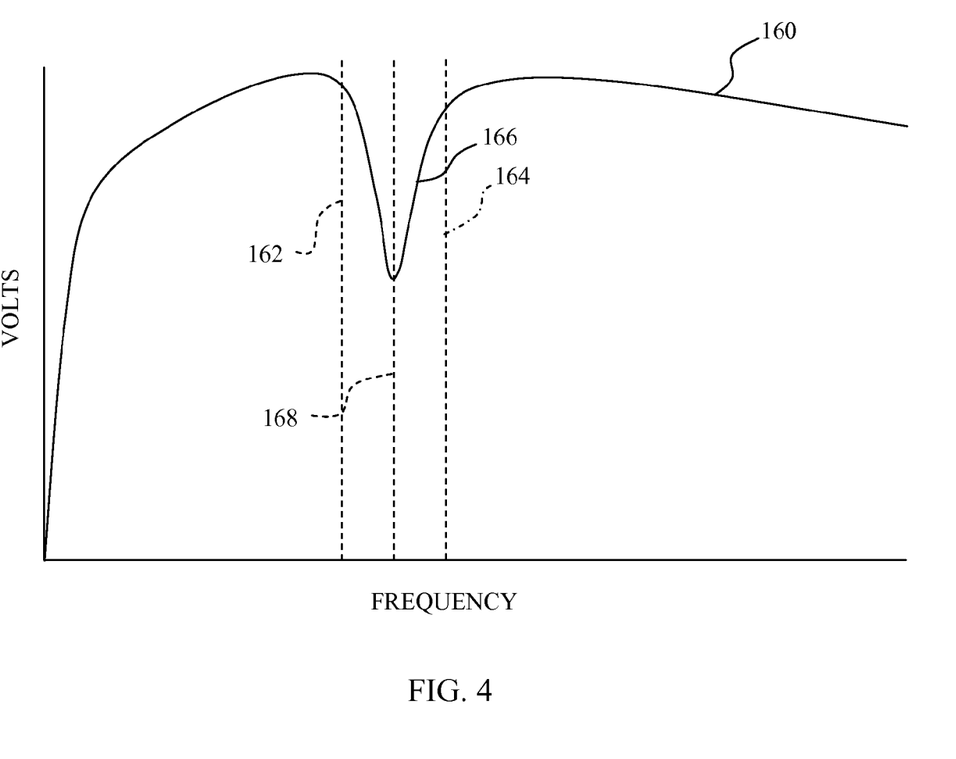
FIG. 4 depicts the measured amplitude of the measuring oscillator in the system of FIG. 3 with a fixed gain as the frequency of the measuring circuit is tuned through frequencies including the resonant frequency of the sensor of FIG. 2 showing a dip that results when the frequency of the measuring oscillator is near the resonant frequency of the sensor tank circuit.

FIG. 4 graphically illustrates the general functioning of the electronic assembly 120. The line 160 represents the measured voltage in a constant current device as frequency of the measuring oscillator 142 is modified from a lower frequency 162 to a higher frequency 164 by changing the capacitance of the variable capacitor 140. As the frequency of the measuring oscillator 142 increases from the frequency 162 to the frequency 164, a dip 166 is observed in the voltage as a result of the impedance reflected into the coil 130 by the coil 124. At the frequency 168, the voltage reaches a local minimum, corresponding to the maximum reflected impedance which occurs as the frequency of the measuring oscillator 142 matches the resonant frequency of the sensor 118.

Figures 5, 6, 7, 8:
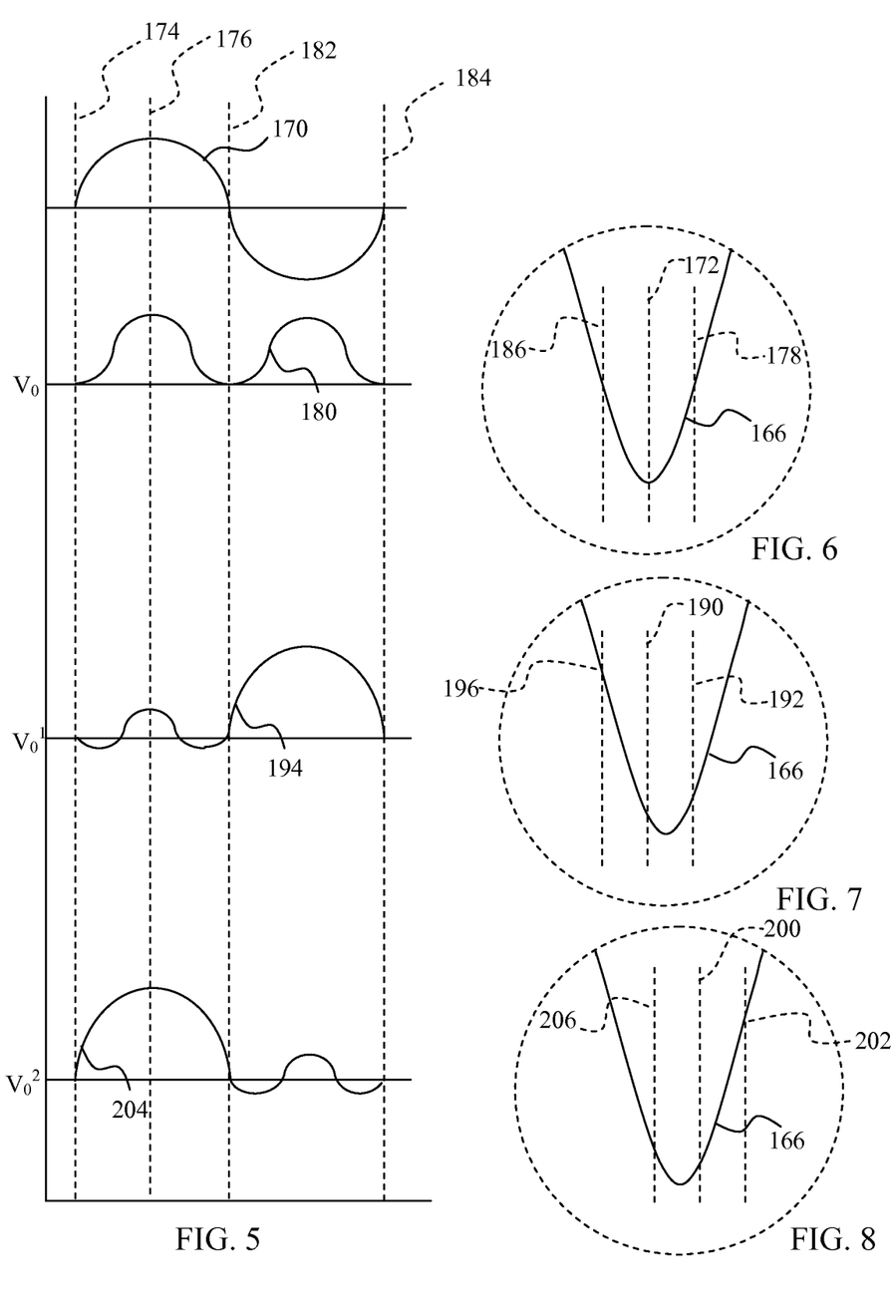
FIG. 5 depicts the low frequency signal applied to the measuring oscillator of FIG. 3 and the changes in the signal behind the demodulation filter which results if the frequency of the measuring oscillator is at the resonant frequency of the sensor tank circuit, if the frequency of the measuring oscillator is below the resonant frequency of the sensor tank circuit, and if the frequency of the measuring oscillator is above the resonant frequency of the sensor tank circuit.
FIG. 6 depicts the signal behind the controller output of the system of FIG. 3 as the frequency of the measuring circuit is modulated with a low frequency signal when the frequency of the measuring oscillator is matched with the resonant frequency of the sensor of FIG. 2.
FIG. 7 depicts the signal behind the controller output of the system of FIG. 3 as the frequency of the measuring circuit is modulated with a low frequency signal when the frequency of the measuring oscillator is below the resonant frequency of the sensor of FIG. 2.
FIG. 8 depicts the signal behind the controller output of the system of FIG. 3 as the frequency of the measuring circuit is modulated with a low frequency signal when the frequency of the measuring oscillator is above the resonant frequency of the sensor of FIG. 2.

In operation, as depicted in FIG. 5, the frequency of the measuring oscillator 142 is controlled by a control signal 170 from the summer 154 which includes a low frequency component from the low frequency source 146. The control signal 170 thus modulates the capacitance of the variable capacitor 140 resulting in a modulated frequency of the measuring oscillator 142. By way of example, if the frequency of the measuring oscillator 142 is matched with the resonant frequency of the sensor LC tank, then, as shown in FIGS. 5 and 6, the frequency of the measuring oscillator 142 is at a frequency associated with the reference line 172 and the voltage 180 of the measuring oscillator 142 is at the minimum value of the dip 166.

As the control signal 170 increases from a base value at reference line 174 to a maximum value at reference line 176, the resonant frequency of the measuring oscillator 142 increases from the frequency associated with the reference line 172 to the frequency associated with the reference line 178. Accordingly the measured voltage of the measuring oscillator 142 increases from an initial value ($V_0$) to a higher value. As the control signal decreases from the maximum value at reference line 176 to the base value at reference line 182, the resonant frequency of the measuring oscillator 142 decreases from the frequency associated with the reference line 178 to the frequency associated with the reference line 172. Accordingly the measured voltage of the measuring oscillator 142 decreases from the maximum value to the initial value ($V_0$).

The control signal 170 then decreases from the base value at reference line 182 to a minimum value followed by a return to the base value at reference line 184. Accordingly, the resonant frequency of the measuring oscillator 142 decreases from the frequency indicated by the reference line 172 to the frequency indicated by the reference line 186 and then returns to the frequency associated with the reference line 172. Accordingly the measured voltage of the measuring oscillator 142 increases from the initial value ($V_0$) to the same maximum value discussed above and then returns to the base value.

The line 180 of FIG. 5 depicts the measured voltage throughout the foregoing sequence. The line 180 thus represents the gain signal that is provided as an input to the demodulator 144 (see FIG. 3). The demodulator 144 further receives a low frequency signal from the low frequency source 146 through the optional phase corrector 148. The demodulator 144 uses the phase corrected low frequency signal to perform a transfer function on the gain signal (voltage 180), as discussed more fully below, and the output of the demodulator 144 is filtered by the filter 150.

As shown in FIG. 5, the gain 180 from the reference line 174 to the reference line 182 is identical to the gain 180 from the reference line 182 to the reference line 184. The phase corrected low frequency signal between the reference line 174 and the reference line 182 (which may be depicted in the same fashion as the control signal 170), however, is 180 degrees in phase relative to the phase corrected low frequency signal from the reference line 182 to the reference line 184. Accordingly, when the phase corrected low frequency signal is used to perform a transfer function on $V_0$, the output of the filter 150 is zero.

The output of the filter 150 is used to modify the controller signal from the PID controller 152. Since the output of the filter 150 is "zero" in this scenario, the controller signal out of the PID controller 152 is not changed. Thus, the frequency of the measuring oscillator 142 is maintained at the frequency associated with the reference line 172. Therefore, when the measuring oscillator 142 is centered on the resonant frequency of the sensor 118, there is no change in the controller signal generated by the PID controller 152.

If the frequency of the measuring oscillator 142 is lower than the resonant frequency of the sensor 118, then, as shown for example in FIGS. 5 and 7, the frequency of the measuring oscillator 142 is at a frequency associated with the reference line 190 and the voltage 194 of the measuring oscillator 142 is at a value greater than the minimum value associated with the dip 166.

In this situation, as the control signal 170 increases from a base value at reference line 174 to a maximum value at reference line 176, the resonant frequency of the measuring oscillator 142 increases from the frequency associated with the reference line 190 to the frequency associated with the reference line 192. Accordingly the measured voltage 194 of the measuring oscillator 142 initially decreases from the initial value ($V_0^1$) to a minimum value associated with the dip 166.

The control signal 170, however, continues to increase after the measured voltage 194 has decreased to the minimum value associated with the dip 166. Accordingly, the voltage 194 begins to increase (see FIG. 7). As the control signal 170 decreases from the maximum value at reference line 176 to the base value at reference line 182, the resonant frequency of the measuring oscillator 142 decreases from the frequency associated with the reference line 192 to the frequency associated with the reference line 190. Accordingly the voltage 194 decreases to below the $V_0^1$ and then increases back to the $V_0^1$.

The control signal 170 then decreases from the base value at reference line 182 to a minimum value followed by a return to the base value at reference line 184. Accordingly, the resonant frequency of the measuring oscillator 142 decreases from the frequency indicated by the reference line 190 to the frequency indicated by the reference line 196. The voltage 194 thus increases to a maximum value and then returns to $V_0^1$. Throughout this phase, the voltage 194 is greater than the $V_0^1$.

In the foregoing scenario, the average of the gain 194 from the reference line 174 to the reference line 182 is slightly positive while the average of the gain 194 from the reference line 182 to the reference line 184 is significantly positive as depicted in FIG. 5. Thus, the overall signal generated by the transfer function using the phase corrected low frequency signal in the manner discussed above is a large negative signal. Accordingly, the output of the filter 150 is negative.

The negative output of the filter 150 is then used to modify the controller signal from the PID controller 152 so as to increase the resonant frequency of the measuring oscillator 142 toward the frequency associated with the local minimum of the dip 166. Thus, when the measuring oscillator 142 is centered on a frequency below the resonant frequency of the sensor 118, the controller signal generated by the PID controller 152 controls the measuring oscillator 142 toward a higher frequency.

In contrast, if the frequency of the measuring oscillator 142 is higher than the resonant frequency of the sensor 118, such as is shown in FIGS. 5 and 8, the frequency of the measuring oscillator 142 is at a frequency associated with the reference line 200 and the voltage 204 of the measuring oscillator 142 is at a value greater than the minimum value associated with the dip 166.

The measuring oscillator 142 in this scenario, in contrast to that of FIG. 7, is operating on the portion of the dip 166 to the right of the dip minimum. Thus, as the control signal 170 increases from a base value at reference line 174 to a maximum value at reference line 176, the resonant frequency of the measuring oscillator 142 increases from the frequency associated with the reference line 190 to the frequency associated with the reference line 202. Accordingly the measured voltage 204 of the measuring oscillator 142 constantly increases from the initial value ($V_0^2$) during this phase. As the control signal 170 decreases back to the base value at reference line 182, the voltage 204 decreases to the $V_o^2$.

The control signal 170 continues to decrease from the base value at reference line 182 to a minimum value. Accordingly, the resonant frequency of the measuring oscillator 142 decreases from the frequency indicated by the reference line 200 to a minimum value associated with the dip 166. The control signal 170 continues to decrease after the measured voltage 204 has decreased to the minimum value associated with the dip 166. Accordingly, the voltage 204 begins to increase until the control signal 170 reaches a minimum value. The control signal 170 then increases back to the base value and the voltage 204 is driven below the $V_o^2$ and then increases back to the $V_o^2$.

In this scenario, the average of the gain 204 from the reference line 174 to the reference line 182, as indicated by FIG. 5, is a large positive value while the average of the gain 204 from the reference line 182 to the reference line 184 is slightly positive. Thus, the overall signal generated by the transfer function using the phase corrected low frequency signal in the manner discussed above is a large positive signal. Accordingly, the output of the filter 150 is positive.

The positive output of the filter 150 is then used to modify the controller signal from the PID controller 152 so as to decrease the resonant frequency of the measuring oscillator 142. Thus, when the measuring oscillator 142 is centered on a frequency above the resonant frequency of the sensor 118, the controller signal generated by the PID controller 152 controls the measuring oscillator 142 toward a lower frequency.

Thus, the electronic assembly 120 automatically controls the measuring oscillator 142 to the resonant frequency of the sensor LC tank while the resonant frequency of the sensor LC tank in turn varies with the change of pressure in the sensor compartment 112. Accordingly, the frequency of the measuring oscillator 142, which is the same as the resonant frequency of the sensor LC tank, is identified by the frequency counter 156 and available for output to another system or component.

The frequency counter 156 may include a precise frequency reference such as a crystal oscillator to facilitate accurate frequency determination. Alternatively, the capacitor value of the variable capacitor 140 may be used to identify the frequency of the measuring oscillator 142. In the event that a switched capacitor array is used as the variable capacitor 140, the capacitor value may be available as a digital value. In this embodiment, a reference frequency is not needed.

Accordingly, the sensor assembly 100 provides data associated with the pressure within the sensor compartment 112 while protecting the electronic assembly 120 from harsh temperatures or fluids, which may be a liquid or a gas, within the sensor compartment 112.

The sensor 118, in contrast, is positioned within the sensor compartment 112 and thus exposed to a potentially harsh environment. Protection for the sensor 118 may be provided by a coating such as a passivation layer, a protective gel, etc. In one embodiment, the sensor is made exclusively from materials that resist adverse reactions from aggressive media. Such materials may include silicon, platinum, and gold.

In the embodiment of FIG. 2, the sensor coil 124 is made of a material exhibiting a change in resistivity as a function of temperature. The use of a material having a resistance that is temperature dependent allows the temperature of the coil 124 to be ascertained.

Temperature identification is provided by observing the operation of the electronic assembly 120 when the measuring oscillator 142 is at the resonant frequency of the coil 124 or at least within the dip 166. In one approach, the change in the measured voltage of the measuring oscillator 142 as the low frequency signal is applied is identified. As discussed above with respect to FIG. 4, the dip 166 is caused by the reflection of the impedance of the coil 124 into the coil 130. The shape of the dip is thus a function of the impedance of the coil 124, which is inversely related to the Q-factor of the sensor 118, and the impedance of the coil 124 changes in response to the temperature of the coil 124. Specifically, as the impedance of the coil 124 increases, the frequency width of the dip 166 increases and the depth of the dip 166 is reduced.

Accordingly, for a known change in frequency, such as the change caused by the low frequency signal applied to the measuring oscillator 142, as the impedance increases, a smaller amplitude of voltage change is observed for the measuring oscillator 142. Therefore, changes in the amplitude of the voltage excursion provide an indication of the temperature of the sensor 118.

Alternatively, the voltage of the measuring oscillator 142 may be used. Specifically, since the minimum value of the dip 166, which is the filtered signal out of the filter 150, is related to the impedance of the coil 124, changes in the minimum voltage observed provide an indication of the temperature of the sensor 118.

Other mechanisms may influence the accuracy of the sensor assembly 100 in addition to temperature. One such mechanism is present when the measured voltage of the sensor assembly 100 is frequency dependent. For example, as seen in FIG. 4, the voltage peaks at about reference lines 162 and 164 and falls off not only in the dip 166, but also at frequencies higher than the frequency associated with the reference line 164 as well as at frequencies below the frequency associated with the reference line 162. Therefore, if the measuring oscillator 142 is not operating in the frequencies associated with the dip 166, the measuring oscillator 142 may not track into the dip 166. Accordingly, an algorithm or other mechanism is preferably provided to ensure that the sensor assembly 100 is operating in the dip 166, and not at another location along the line 160.

Additionally, when the sensor assembly 100 applies the low frequency signal to the variable capacitor 140, the resultant voltage or gain is ultimately transmitted to the PID controller 152 resulting in a modified control signal from the summer 154. The low frequency signal thus adds some amount of noise to the sensor assembly 100. The system 210 depicted in FIG. 9 mitigates this type of noise.

Figure 9:
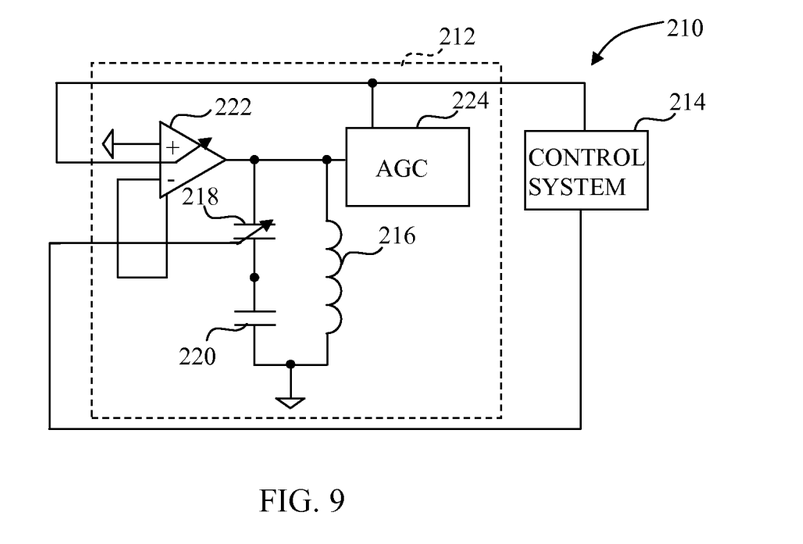
FIG. 9 depicts a schematic diagram of a circuit on the application specific integrated circuit of the sensor assembly of FIG. 1 that provides automatic tuning of a measuring oscillator to match the resonant frequency of a tank circuit of the sensor of FIG. 1 while reducing noise because the circuit topology of FIG. 9 prevents a frequency dependent gain change.

The system 210 includes a measuring oscillator 212 and a control system 214. The measuring oscillator 212 includes a primary coil 216 and a variable capacitor 218. The system 210 further includes a capacitor 220, a gain variable transconductance amplifier (gvOTA) 222, and an automatic gain control 224. The gvOTA 222 functions as a feedback voltage controlled current source. The feedback voltage control is provided by the capacitive voltage divider of the variable capacitor 220 and the capacitor 222.

In operation, the control system 214 maintains the amplitude of the system 210 constant by controlling the gain on the gvOTA 222. Thus, if the control system 214 senses a decrease in the frequency, a signal is provided to the variable capacitor 218 reducing the capacitance of the variable capacitor 218. Accordingly, the resonant frequency of the measuring oscillator 212 increases and less current is needed to drive the measuring oscillator 212. At the same time the frequency is modified, the voltage between the variable capacitor 218 and the capacitor 220 is reduced since the capacitance of the variable capacitor 218 has been reduced.

The reduced voltage is felt by the gvOTA 222 causing less current to be provided to the AGC 224. Thus, instead of forcing the AGC 224 to react and force the current output of the gvOTA 222 to be reduced, modification of the capacitance of the variable capacitor 218 functions to change the resonant frequency of the measuring oscillator 212 and to also reduce the current output of the gvOTA 222. Accordingly, noise associated with introduction of a low frequency signal is reduced.

Components selected for the sensor 100 may implicate other mechanisms influencing the accuracy of the sensor 100. For example, the variable capacitors 140/220 may be varactor diodes. A digital-analog converter (DAC) could be incorporated in varactor diode system to allow use of a digital control system. In another embodiment, the variable capacitors 140/220 employ a switched capacitor technology. A switched capacitor system may incorporate binary weighted capacitors (e.g., C-2C arrangements). Unity caps may be further incorporated to minimize matching problems.

A binary weighted C-2C system may, however, generate undesired charging and discharging of capacitances. For example, as the capacitor array approaches and passes the ½ full range value, the smaller capacitors which are at full range value as the ½ value is approached are discharged and the largest capacitor, which is not charged when the system is below ½ full range value, is charged. Thus, the amplitude control (AGC) is subjected to an injection of noise which affects the sensor signal in general.

Figure 10:
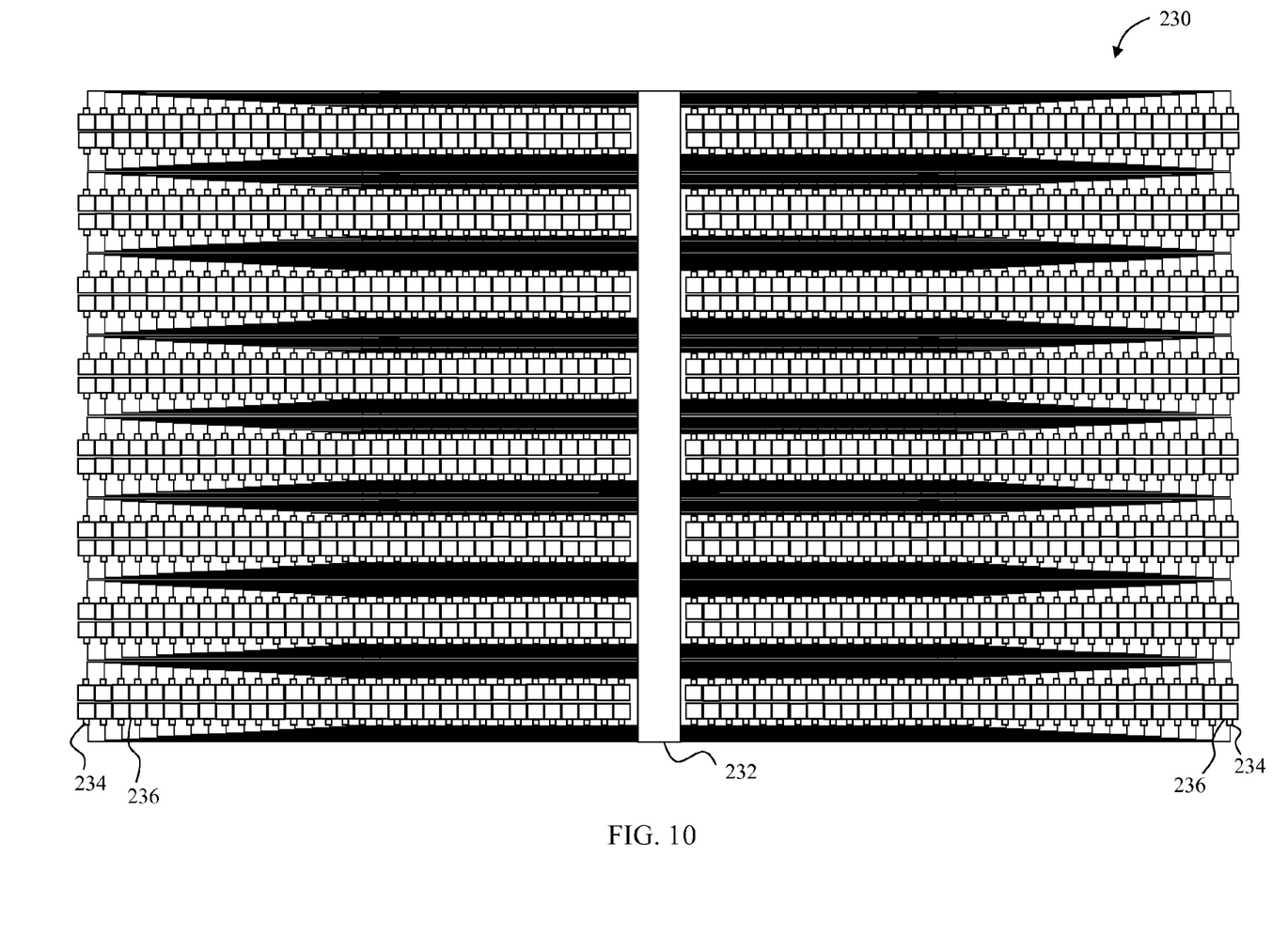
FIG. 10 depicts a top plan view of a switched capacitor that may be used as a variable capacitor in the measuring oscillator of the sensor assembly of FIG. 1.

One approach to reduce capacitor related noise is the incorporation of a switched capacitor such as the switched capacitor 230 as depicted in FIG. 10. The switched capacitor 230 includes a decoder 232, a plurality of switching transistors 234, and a respective plurality of unity capacitors 236. Each of the switching transistors 234 is individually controlled through the decoder 232. The switched capacitor 230 can thus be directly controlled from a digitally implemented control.

The switching transistors 234 may be N-MOS transistors. By way of example, the switching transistors 234 may be positioned within a well (not shown). The well may be biased with a voltage to make optimum use of the switching transistors by reducing resistance. The incorporation of level shifters for controlling the gate voltage of the switch transistors reduces the resistance of the system.

Figure 11:
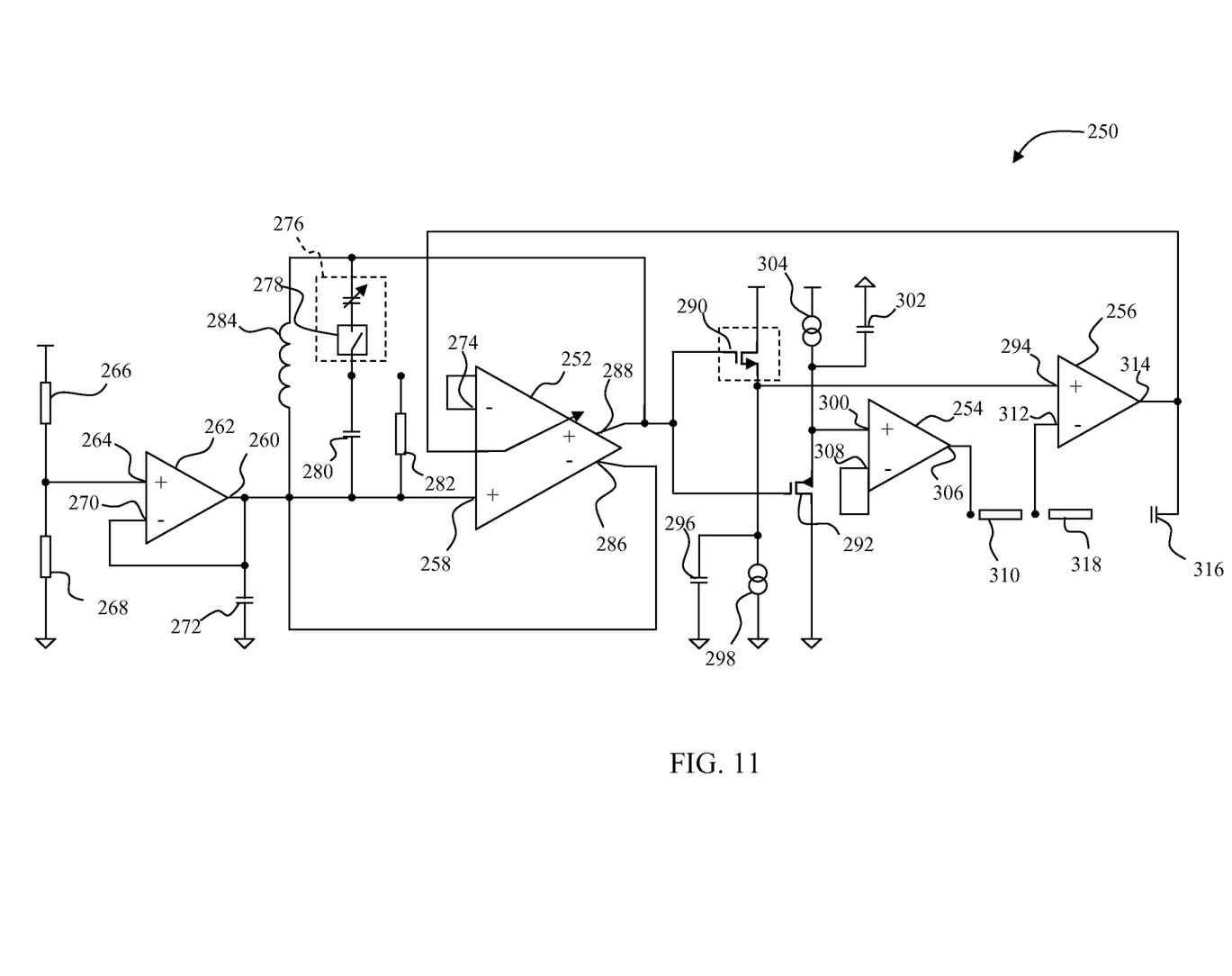
FIG. 11 depicts a schematic diagram of a circuit on the application specific integrated circuit of the sensor assembly of FIG. 1 with a measuring oscillator including threshold dependent automatic amplitude gain control that provides a system as shown in FIG. 3 the ability to form a self-tuning system of a measuring oscillator to match the resonant frequency of a tank circuit of the sensor of FIG. 1 while reducing noise within the system by incorporating a variable current gain operational transconductance amplifier.

In a switched capacitor system, the voltage across the non-variable capacitor (e.g., the capacitor 220) must be smaller than the threshold voltage of the switch transistors of the variable capacitor. A system that provides a good voltage control for the non-variable capacitor 280 is depicted in FIG. 11. The measuring oscillator 250 in FIG. 11 includes a gvOTA 252, an OPA 254, and a PID OPA 256. One input 258 of the gvOTA 252 is connected to a constant voltage source. One embodiment of such a voltage source is shown in FIG. 11 as the outlet 260 of an OPA 262. One input 264 of the OPA 262 is biased by a voltage divider provided by a resistor 266 and a resistor 268. The other input 270 of the OPA 262 is connected to the output 260 of the OPA 262, through a capacitor 272, forming a voltage follower. The capacitor 272 is optional, and typically used for a selected OPA 262 that is not as strong or fast as desired for a particular circuit.

The second input 274 of the gvOTA 252 is biased by a capacitive divider provided by a variable capacitor 276. The variable capacitor 276 includes a switch 278, which may be one of a plurality of switched capacitors within a well in a VDD2, and a capacitor 280. A resistor 282 is in parallel with the capacitor 280 between the input 258 and the input 274 of the gvOTA 252. The variable capacitor 276 and the capacitor 280 are in parallel with a coil 284. The coil 284 functions as the primary coil for coupling with a sensor coil such as the coil 124. One side of the coil 284 is connected to an output 286 of the gvOTA 252 and the other side of the measuring oscillator is connected to an output 288 of the gvOTA 252.

The output 288 of the gvOTA 252 is further connected to an N-transistor 290 and to a P-transistor 292. The N-transistor 290 is configured to charge a capacitor 296 while a weak current source 298 is positioned in parallel with the capacitor 296 to discharge the capacitor 296. The P-transistor 292 is connected to an input 300 of the OPA 254 and is further configured to discharge a capacitor 302. A weak current source 304 is positioned in parallel with the capacitor 302 to charge the capacitor 302.

The output 306 of the OPA 254 in this embodiment is connected to a second input 308 of the OPA 254 and, through a resistor 310, to the second input 312 of the PID OPA 256. The output 314 of the PID OPA 256 is connected through a capacitor 316 and a resistor 318 to the second input 312 of the PID OPA 256. The output 314 of the PID OPA 256 also controls the gain of the gvOTA 252.

The transistors 290/292, capacitors 296/302 and current sources 298/304 are configured to apply the highest voltage output of the gvOTA 252 to the input 294 of the PID OPA 256 and to apply the lowest voltage output of the gvOTA 252 to the input 300 of the OPA 254. This is accomplished because the transistor 290 rapidly charges the capacitor 296 while the current source 298 slowly discharges the capacitor 296. Accordingly, the capacitor 296, which is connected to the input 294, is kept at the highest output voltage of the gvOTA 252 minus the threshold voltage of the transistor 290.

Additionally, the transistor 292 rapidly discharges the capacitor 302 while the current source 304 slowly charges the capacitor 304. Accordingly, the capacitor 304, which is connected to the input 300, is kept at the lowest output voltage of the gvOTA 252 plus the threshold voltage of the transistor 292. Alternatively, sample and hold circuitry may be provided to apply the highest voltage output of the gvOTA 252 to the input 294 of the PID OPA 256 and to apply the lowest voltage output of the gvOTA 252 to the input 300 of the OPA 254.

Accordingly, when operating with the voltage of the capacitors 296 and 302 matched, the peak to peak voltage of the measuring oscillator comprising the coil 284 and the capacitors 276 and 280 equals the average threshold values of the transistors 290/292. Thus, the threshold values of the transistors 290/292 can be selected to establish the desired voltage applied across the switch 278. The DC portion of the voltage between the capacitor 276 and the capacitor 280 is further established by the resistor 282. In one embodiment, the resistor 282 is a high ohmic resistor. Alternatively, a weak current source may be used to establish a desired voltage between the capacitor 276 and the capacitor 280.

A number of modifications may be incorporated with the foregoing circuits in addition to those identified above. By way of example, the PID controller circuit around OPA 256 may be replaced by a PI controller circuit. Additionally, an adjustable controller may be used so as to optimize the sensor system 250 for a particular sensor coil or frequency range. The gvOTA 252 may also be provided with a gain range switching capability to allow optimization of the sensor system 250 for use with different sensor elements or temperature regimes. Additionally, other components may be incorporated into the sensor system 250 for a particular application. For example, a linearizer circuit may be incorporated to linearize the voltage gain of the gvOTA 252.

In an ideal scenario, the inclusion of the gvOTA 252 provides a frequency independent response. Typically, however, a gvOTA will exhibit some frequency dependent characteristics. For example, the gain of a gvOTA typically rolls off at higher frequencies. Accordingly, more gain is needed for a measuring oscillator at higher frequencies. The sensor system 350 of FIG. 12 mitigates this effect.

Figure 12:
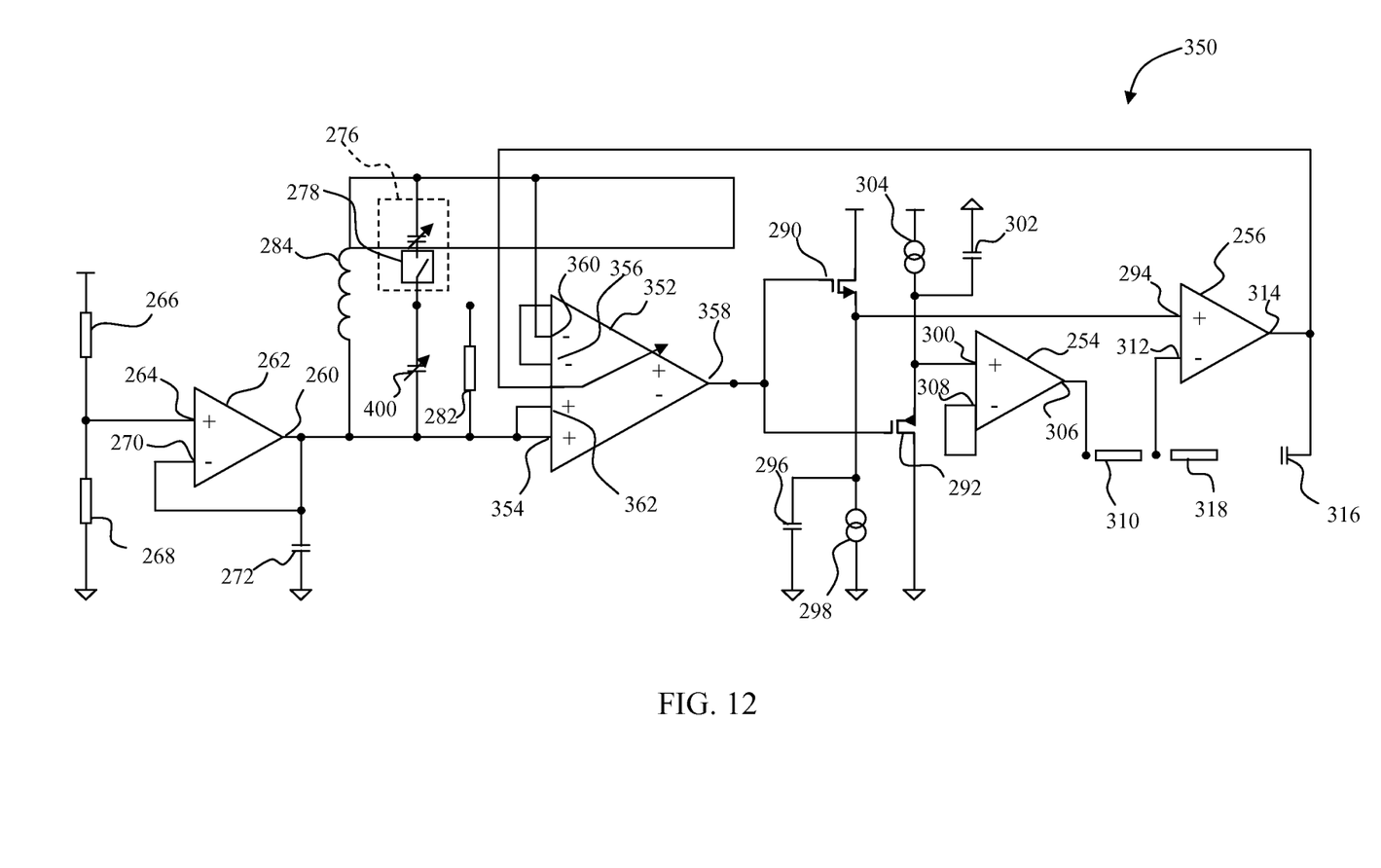
FIG. 12 depicts a schematic diagram of a circuit on the application specific integrated circuit of the sensor assembly of FIG. 1 with a single ended feedback circuit with dual inputs that provides a system as shown in FIG. 3 the ability to form a self-tuning system of a measuring oscillator to match the resonant frequency of a tank circuit of the sensor of FIG. 1 while reducing noise within the system by incorporating a variable current gain operational transconductance amplifier.

The sensor system 350 includes many of the same components as the system 250 which are numbered in like manner as the components of the system 250. One difference between the system 250 and the system 350 is that in place of the gvOTA 252, the system 350 includes a gvOTA 352. The gvOTA 352 includes inputs 354 and 356 which are configured similarly to the inputs 258 and 274 of the system 250. The output 358 of the gvOTA 352, however, is not connected to the input 354. Additionally, the gvOTA 352 includes two additional inputs, input 360 and 362. The input 360 is connected to the output 358 while the input 362 and the input 354 are connected to the lower leg of the LC tank with the voltage at this leg established by the output 260 of the OPA 262.

Figure 13:
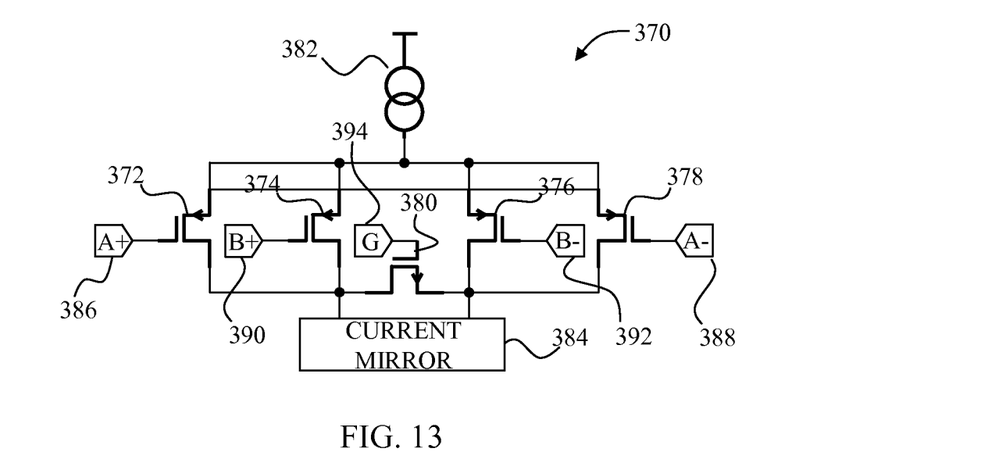
FIG. 13 depicts a schematic diagram of an input stage that may be used with the variable current gain operational transconductance amplifier of FIG. 12.

The configuration of the gvOTA 352 is thus modified to allow differential voltages between inputs to be summed inside of the gvOTA 352 with a fixed or variable ratio as desired. In one embodiment, the input of the gvOTA 352 is configured as a standard differential N-MOS input stage employing two input transistor pairs in parallel with a defined transistor ratio as depicted in FIG. 13. The input 370 of FIG. 13 includes input stage transistors 372, 374, 376, and 378.

The input transistors 372 and 378 are configured as one input pair and the input transistors 374 and 376 are configured as a second input pair. Signals generated by the paired transistors 372, 374, 376, and 378 are summed at the drain connection of the differential amplifier stage. The ratio of the summation is defined by the W/L ratio of the input transistors relative to each other. By way of example, if (at the same length) the width of the input of transistor 374 is twice the width of the input of transistor 372, then a signal at the input of transistor 374 will get amplified as twice as much as an input signal on the input of transistor 372. Therefore, the gain of the gvOTA 252 can be established by selecting the ratio of C1/C2 and the W/L of the input of transistor 372 and "input of transistor 374.

Figure 14:
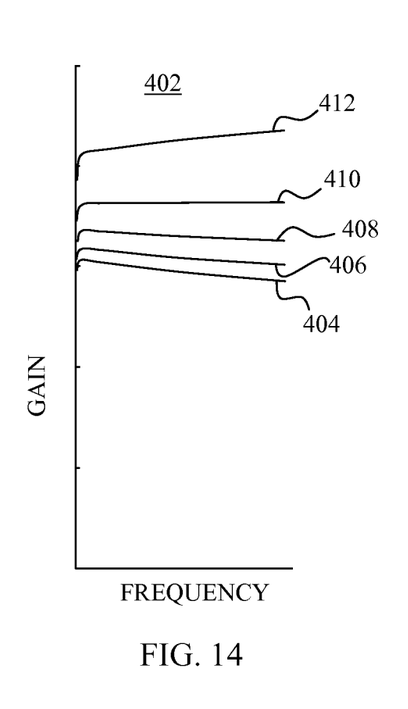
FIG. 14 depicts various measuring oscillator frequency response curves without sensor coupling that may be obtained by implementing a trimable capacitor in the circuit of FIG. 12.

The gain of the capacitive divider (the variable capacitor 276) can also be adjusted by the capacitor 400, which in the system 350 is a trimable capacitor. The effect of changing the capacitance of the capacitor 350 is depicted in FIG. 14. FIG. 14 depicts a graph of the gain of the gvOTA 352 verses frequency without any coupling between the coil 284 and a sensor coil. The measuring oscillator frequency response curves 404, 406, 408, 410, and 412 reflect the effects of changing the capacitance from a lower value (curve 404) to iteratively higher values, with curve 412 representing the highest value.

Figure 15:
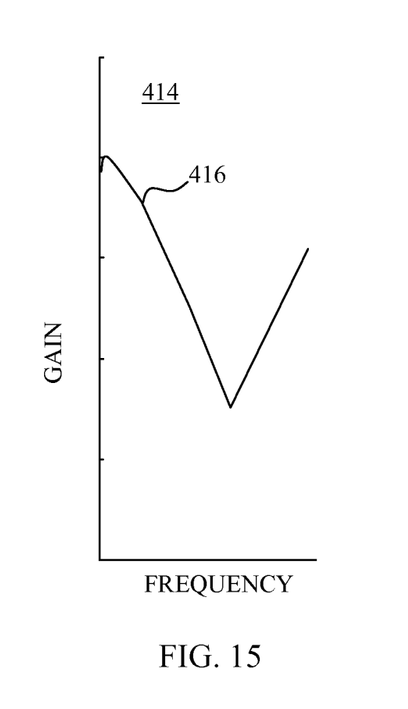
FIG. 15 depicts a measuring oscillator frequency response curve that may be obtained by implementing a trimable capacitor of FIG. 14 in the circuit of FIG. 12 with a sensor coupled to the measuring oscillator.

The capacitor 400 can thus modify the measuring oscillator frequency response from a negative slope (curve 404), to a substantially flat slope (curve 410), to a positive slope (curve 412). By selecting the capacitance associated with the slope 410 and coupling the coil 284 with the coil 124, the measuring oscillator frequency response curve 416 of FIG. 15 is obtained. The desired slope can thus be selected such so as to obtain the desired operating characteristics when the coil 284 is coupled with a sensor coil such as coil 124.

While the present invention has been illustrated by the description of exemplary system components, and while the various components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. A pressure sensor assembly for use with an application specific integrated circuit, comprising:
   a capacitive sensor;
   a sensor coil within a first sensor compartment and operatively connected to the capacitive sensor to form a sensor L-C tank circuit;
   a measuring oscillator including a measuring coil located within a second sensor compartment and spaced apart from the sensor coil and a feedback circuit configured to provide a control signal for the measuring oscillator based upon an output of the measuring oscillator; and
   a low frequency signal source configured to provide a low frequency signal to the measuring oscillator.

2. The assembly of claim 1, wherein the sensor coil is thermally connected to the capacitive sensor, the sensor coil comprising a material which exhibits a change in resistivity as the temperature of the material changes, and the assembly is configured to provide an indication of a temperature of the sensor coil.

3. The assembly of claim 1, wherein the measuring oscillator
   a variable gain operational transconductance amplifier (gvOTA) with a first input operably connected to the feedback circuit.

4. The assembly of claim 3, wherein:
   a first output of the gvOTA is connected to a first end of a measuring oscillator L-C tank; and
   a second output of the gvOTA is connected to a second end of the measuring oscillator L-C tank.

5. The assembly of claim 3, wherein the measuring oscillator comprises:
   a first variable capacitance capacitor operably connected to a first output of the gvOTA and a second input of the gvOTA; and
   a second capacitor operably connected to the second input of the gvOTA and to a third input of the gvOTA.

6. The assembly of claim 5, wherein the second capacitor is a trimable capacitor.

7. The assembly of claim 6, wherein the trimable capacitor is a switched capacitor.

8. The assembly of claim 5, wherein the first variable capacitance.

9. The assembly of claim 5, further comprising:
   a resistor operably connected between the second input of the gvOTA and the third input of the gvOTA.

10. The assembly of claim 3, wherein a second output of the gvOTA is operably connected to the second capacitor.

11. The assembly of claim 3, wherein the gvOTA comprises:
    a differential N-MOS input stage including a first pair of input transistors and a second pair of input transistor, the second pair of input transistors parallel to the first pair of input transistors.

12. The assembly of claim 3, further comprising:
    a first source follower including a first transistor operably connected to an output of the gvOTA, a first capacitor operably connected to a first drain of the first transistor, and a weak current source operably connected to the first capacitor and configured to discharge the first capacitor; and
    a second source follower including a second transistor operably connected to the output of the gvOTA, a second capacitor operably connected to a second drain of the second transistor, and a weak current source operably connected to the second capacitor and configured to charge the second capacitor, wherein the first source follower and the second source follower are configured to detect an amplitude of a measuring oscillator signal and provide an amplitude reference signal to a controller.

13. The assembly of claim 3, wherein:
the gvOTA is a single ended gvOTA with a single output;
the output of the gvOTA is connected to a first end of a measuring oscillator L-C tank; and
a second end of the measuring oscillator L-C tank is connected through an AC path to a ground common to the gvOTA.

14. The assembly of claim 1, wherein the feedback circuit comprises:
a proportional-integral-derivative (PID) controller configured to receive a demodulated measuring oscillator signal.

15. A method of identifying a pressure of a fluid comprising:
coupling a measuring oscillator which is isolated from the fluid with a sensor component;
establishing a circulating current within the sensor component through the coupling;
exposing a capacitive sensor of the coupled sensor component to the fluid;
establishing a resonant frequency of the sensor component based upon the exposure;
varying the frequency of the coupled measuring oscillator;
generating a change in voltage for the measuring oscillator with the varied frequency;
controlling the frequency of the measuring oscillator based upon the generated change in voltage; and
generating a signal associated with the pressure of the fluid based upon the controlled frequency of the measuring oscillator.

16. The method of claim 15, further comprising:
generating a signal associated with a temperature of the sensor component based upon the generated voltage change.

17. The method of claim 15, wherein generating a change in voltage comprises:
applying a low frequency signal to a measuring oscillator control signal.

18. The method of claim 15, wherein varying the frequency of the coupled measuring oscillator comprises:
modifying a switched capacitance of a capacitor in the measuring oscillator.

19. The method of claim 18, wherein generating a signal associated with the pressure of the fluid comprises:
generating a signal associated with the pressure of the fluid based upon the modified capacitance.

20. The method of claim 15, further comprising:
establishing an operating frequency response of the measuring oscillator with a trimable capacitor.

21. The method of claim 15, wherein controlling the frequency of the measuring oscillator comprises:
detecting an amplitude of a measuring oscillator signal using a first and a second source follower; and
providing an amplitude reference signal using the first and the second source follower.

22. The method of claim 15, wherein controlling the frequency of the measuring oscillator comprises:
providing a first output of a variable current operational transconductance amplifier (gvOTA) to a first end of an L-C tank; and
providing a second output of the gvOTA to a second end of an L-C tank.

23. The method of claim 15, wherein controlling the frequency of the measuring oscillator comprises:
connecting a first capacitor between a first input of a variable current operational transconductance amplifier (gvOTA) and a second input of the gvOTA;
connecting a second capacitor between the second input of the gvOTA and an output of the gvOTA; and
establishing a voltage at the second input with a capacitive voltage divider.

* * * * *